May 17, 1932.  J. YOUNG  1,858,352
COMBINATION DRILLING VALVE AND BLOW-OUT PREVENTER
Filed April 7, 1930  2 Sheets-Sheet 1
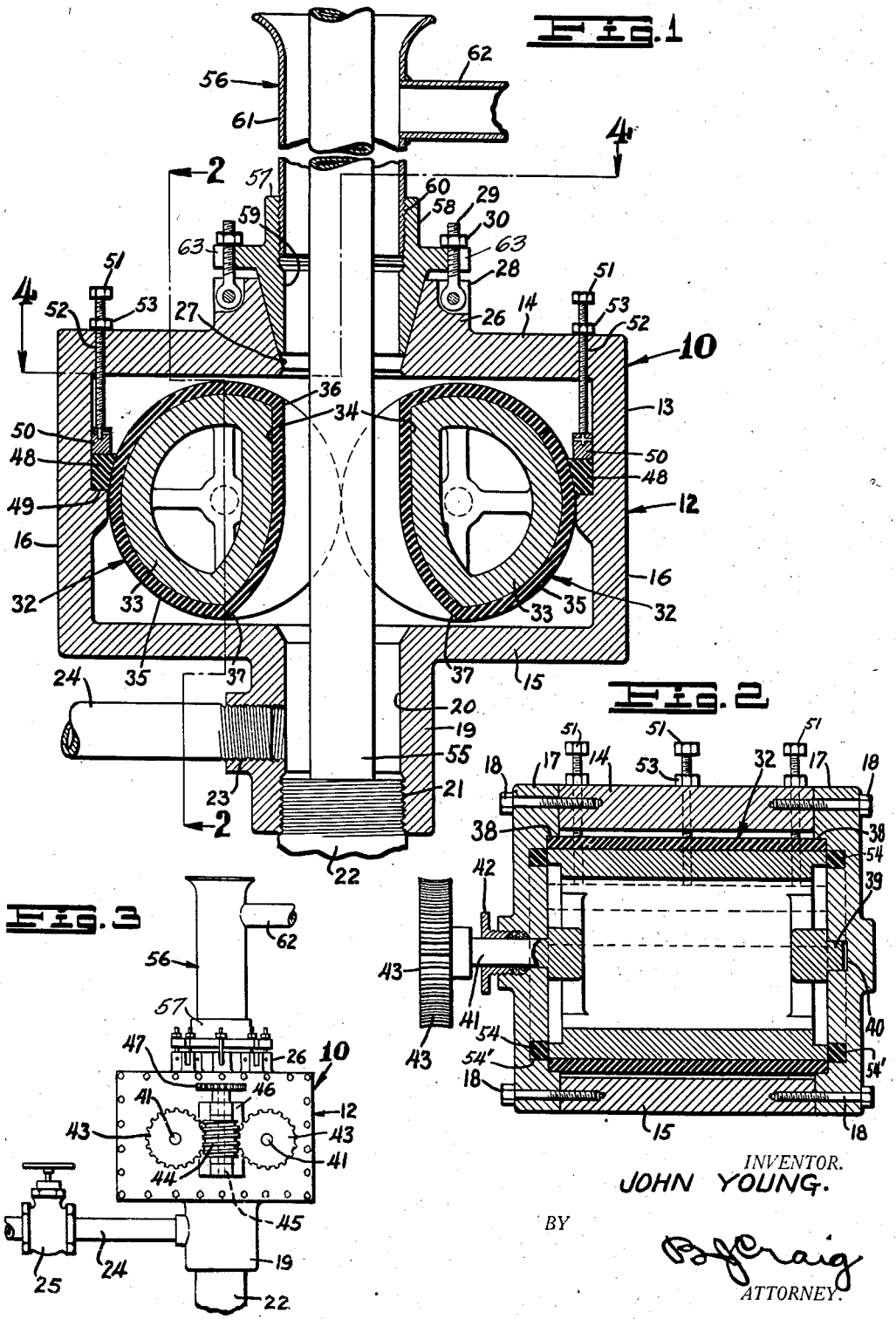
INVENTOR.
JOHN YOUNG.
BY
B. J. Craig
ATTORNEY.

May 17, 1932. J. YOUNG 1,858,352
COMBINATION DRILLING VALVE AND BLOW-OUT PREVENTER
Filed April 7, 1930 2 Sheets-Sheet 2
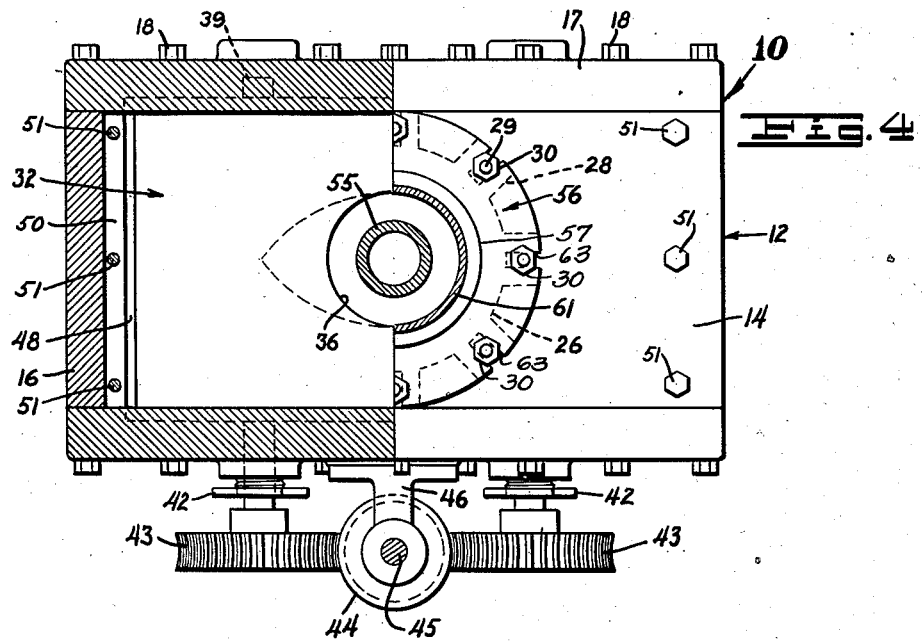
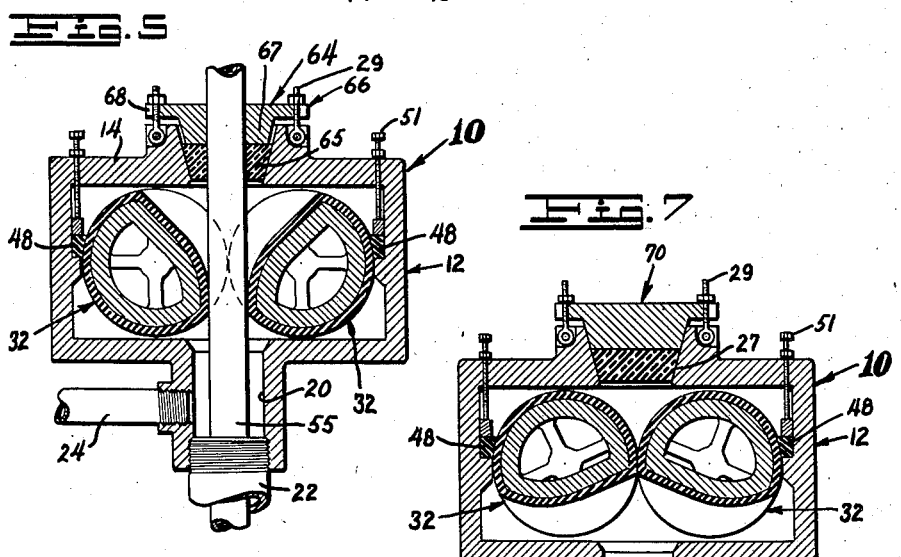
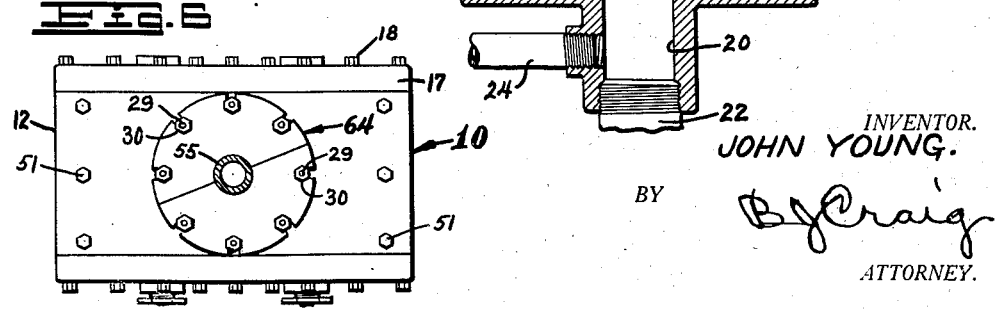
INVENTOR.
JOHN YOUNG.
BY
ATTORNEY.

Patented May 17, 1932

1,858,352

UNITED STATES PATENT OFFICE

JOHN YOUNG, OF LOS ANGELES, CALIFORNIA

COMBINATION DRILLING VALVE AND BLOW-OUT PREVENTER

Application filed April 7, 1930. Serial No. 442,155.

REISSUED

This invention relates to improvements in a combination drilling valve and blow-out preventer.

The general object of the invention is to provide an improved device of the class described which will not interfere with the drilling or the running in or out of the well and which will produce an effective shut-off around various sizes of tools or pipes or when no tools or pipes are in the well.

A further object of the invention is to provide a blow-out preventer wherein a pair of rotatable members produce the shut-off action.

Other objects and advantages of my invention will be apparent from the following description taken in connection with the accompanying drawings wherein:

Fig. 1 is a central vertical section through my improved device.

Fig. 2 is a section taken on line 2—2 of Fig. 1.

Fig. 3 is a side elevation of the device on a reduced scale.

Fig. 4 is a section taken on line 4—4 of Fig. 1.

Fig. 5 is a view on a reduced scale similar to Fig. 1 showing the device actuated to shut-off around a string of drill tubing.

Fig. 6 is a top plan view of Fig. 5, and

Fig. 7 is a view similar to Fig. 5 showing the device actuated to close the passageway in the well when no drill tubing is in the well.

Referring to the drawings by reference characters I have indicated my improved device generally at 10. As shown this device comprises a housing 12 which includes a casing 13 comprising a top 14, a bottom 15 and ends 16. A pair of sides 17 are secured to the casing by bolts 18.

Extending downward from the bottom 15 I provide a neck 19 which includes an aperture 20 opening into the casing and the lower portion of which is threaded as at 21 for securing it to the well casing or other suitable support 22.

The neck 19 is preferably provided with a threaded aperture 23 in which I secure a pipe 24 which is preferably provided with a control valve 25 and which may extend to a suitable reservoir.

The top 14 is provided with a neck 26 which includes a frustro-conically shaped aperture 27 which is coaxial with the aperture 20 and converges toward the casing and opens thereinto. The lower end of the aperture 27 is approximately the same diameter as the diameter of the aperture 20. The neck 26 includes a plurality of spaced pairs of lugs 28, between each pair of which I pivotally secure a threaded bolt 29 having a nut 30 thereon.

Within the housing 12 I provide a pair of rollers 32 which are so positioned that the periphery of the rollers contact on the axis of the apertures 20 and 27. Each of these rollers include a metal cylinder 33 having an arcuate groove 34 therein. The grooves at one end are of a radius larger than the radii of the apertures 20 and 27 and the radius of the grooves diminishes toward the periphery of the roller.

The periphery of each roller is covered with a material 35 such as a specially prepared rubber which is vulcanized on the roller and extends into the arcuate portion 34 of the roller. The radius of the groove or arcuate portion 34 when the covering 35 is in position is such that the large end 36 thereof is of approximately the same radius as that of the apertures 20 and 27 and diminishes to a point at the periphery of the roller as at 37.

Each end of the rollers 32 are positioned in recesses 38 provided in the sides 17 and they each include a stud shaft 39 which is positioned in a bearing recess 40 provided in one of the sides 17 and a shaft 41 which extends through the opposite side 17 and is packed off by a packing gland 42. Adjacent the outer ends of the shafts 41 I provide worm gears 43 which mesh with a worm pinion 44 on a shaft 45 positioned in bearings 46 and secured to the shaft 45 I have shown a sprocket wheel 47 which may be remotely operated by a sprocket chain.

It will be understood of course that a hand wheel, an electric motor, or any other suitable device may be used for rotating the shaft 45.

Between the ends 16 of the casing and each roller 32 I provide a packing member 48 which is preferably made of a specially prepared rubber or other resilient material and which is adapted to rest on a seat 49 integral with the ends 16. For compressing and expanding each of the packing members 48 I provide a metal bar 50 which is adapted to be moved against the packing member by a threaded bolt 51 which extends through a similarly threaded aperture 52 in the top 14 and is provided with a nut 53 for locking it in an adjusted position.

The ends of the rollers 32 which are positioned in the recesses 38 are adapted to engage packing rings 54 which are positioned in annular grooves 54' in the recesses 38. These packing rings may be made of rubber or other suitable material and are normally of greater depth than the depth of the grooves 54' so that when the device is operatively assembled the ends of the rollers compress the packing rings.

From the foregoing it will be seen that when the rollers 32 are positioned as shown in Fig. 1 with the large part of the arcuate portions upward and the straight portions vertical there is an unobstructed passageway through the device of approximately the same diameter as the diameter of the aperture 20. When the rollers are rotated by means of the worm pinion 44 and the worm gears 43 the passageway formed by the arcuate portions of the rollers remains circular but gradually diminishes until it is completely closed as shown in Fig. 7.

During a drilling operation when there is a string of drill tubing 55 operating in the well I provide a drilling nipple 56 on the device 10. As shown this drilling nipple includes a body portion 57 having a downwardly extending frustro-conically shaped collar 58 which is adapted to be positioned in the aperture 27 of the neck 26. The collar 58 is provided with an aperture 59, the upper portion of which is threaded as at 60 for securing thereto a pipe 61. The pipe 61 is preferably outwardly flared at its upper end and has a flow pipe 62 extending therefrom. The body portion 57 is provided with a plurality of slots 63 in which the bolts 29 are adapted to be positioned and the nuts 30 are adapted to secure the drilling nipple in position on the housing 12.

Should the well start to blow in while the drill tubing 55 is in the well the rollers are rotated until the passageway formed by the arcuate portions of the rollers is closed by the reduced portions of the arcuate portions engaging the drill tubing as shown in Fig. 5. When the rollers are in this position the gas in the well cannot pass through the device around the drill tubing and the packing members 48 prevent the gas pressure from passing around the rollers.

After the rollers have been actuated to close the passageway through the device the drilling nipple 56 may be moved out of engagement with the device and a plug 64 put in its place. As shown this plug comprises a split ring 65 which fits around the drill tubing and which is made of a resilient material such as a specially prepared rubber and a split metal clamping member 66 which surrounds the drill tubing.

The ring 65 is conically shaped and is positioned in the aperture 27 of the neck 26 and the clamping member 66 includes a conically shaped portion 67 which engages the ring 65 and a plurality of slots 68 in which the bolts 29 are positioned so that the nuts 30 clamp the plug in position. Thus, even though the rollers 32 give way, the plug 64 would still effectively pack off around the drill tubing.

When the device 10 is actuated to a closed position the pressure in the well may be relieved by opening the control valve 25 in the pipe line 24. When the device is actuated to a closed position when there is no drill tubing in the well as shown in Fig. 7 a solid plug 70 similar to the plug 64 is secured in position to close the passageway through the aperture 27.

What I claim is:

1. In a drilling apparatus, the combination of a well casing, a drill stem rotatable in said casing, a supplementary casing, there being an aperture in said supplementary casing through which said drill stem extends, a pair of cylinders rotatably mounted in said supplementary casing, said cylinders having aligned peripheral grooves therein, said grooves being arranged to form circular apertures of varying diameters and a cushion member in said apertures.

2. In a device of the class described, a casing, an aperture in the bottom of said casing, an aperture in the top of said casing, said apertures being coaxial, a pair of rollers in said casing, recesses in the sides of said casing, said rollers extending across said casing and the ends of said rollers being positioned in said recesses, a resilient covering on said rollers, the periphery of said rollers being in engagement, a groove in each of said rollers, said grooves being semi-cylindrical, one portion of said grooves being of approximately the same radius as the radii of said casing apertures and diminishing to a point on the periphery of said rollers, said grooves in one position of said rollers forming a passageway through said casing of approximately the same diameter as the diameter of said casing apertures and upon rotation of said rollers the shape of said passageway remaining circular and diminishing until completely closed by the periphery of said rollers.

3. In a device of the class described, a casing, an aperture in the bottom of said casing, an aperture in the top of said casing, said apertures being coaxial, a pair of rollers rotatable in said casing, the periphery of said rollers being in engagement, a groove in each of said rollers, said grooves being semi-cylindrical, one portion of said grooves being of approximately the same radius as the radii of said casing apertures and diminishing to a point on the periphery of said rollers, said grooves in one position of said rollers forming a passageway through said casing of approximately the same diameter as the diameter of said casing apertures and upon rotation of said rollers the diameter of said passageway diminishing until completely closed by the periphery of said rollers, a packing means positioned between the periphery of each of said rollers and the adjacent wall of said casing, and means to rotate said rollers.

4. In a device of the class described, a casing, an aperture in the bottom of said casing, an aperture in the top of said casing, said apertures being coaxial, a pair of rollers in said casing, recesses in the sides of said casing, said rollers extending across said casing and the ends of said rollers being positioned in said recesses, a resilient covering on said rollers, the periphery of said rollers being in engagement, a groove in each of said rollers, said grooves being arcuate, one portion of said grooves being of approximately the same radius as the radii of said casing apertures and diminishing to a point on the periphery of said rollers, said grooves in one position of said rollers forming a passageway through said casing of approximately the same diameter as the diameter of said casing apertures and upon rotation of said rollers the diameter of said passageway diminishing until completely closed by the periphery of said rollers, and means to rotate said rollers.

5. In a device of the class described, a casing, an aperture in the bottom of said casing, an aperture in the top of said casing, said apertures being coaxial, a pair of rollers in said casing, recesses in the sides of said casing, said rollers extending across said casing and the ends of said rollers being positioned in said recesses, a resilient covering on said rollers, the periphery of said rollers being in engagement, a groove in each of said rollers, said grooves being semi-cylindrical, one portion of said grooves being of approximately the same radius as the radii of said casing apertures and said grooves diminishing to a point on the periphery of said rollers, said grooves in one position of said rollers forming a passageway through said casing of approximately the same diameter as the diameter of said casing apertures and upon rotation of said rollers the diameter of said passageway diminishing until it is completely closed by the periphery of said rollers, a packing member positioned between the periphery of each of said rollers and the adjacent end of said casing, a seat on which said packing members are positioned, a compression member associated with each of said packing members, a threaded bolt engaging each of said compression members, said bolts extending through threaded apertures in said casing and being provided with lock nuts, a shaft on each of said rollers, said shafts extending through said casing, a packing gland associated with each of said shafts, a gear on each of said shafts, said gears being in mesh with a common pinion gear and means to rotate said pinion gear.

6. In a device of the class described, a casing, there being an aperture in the bottom of said casing and an aperture in the top of said casing, said apertures being coaxial, a pair of rollers in said casing, recesses in the sides of said casing, said rollers extending across said casing and the ends of said rollers being positioned in said recesses, an annular groove in each of said recesses, a packing member in each of said grooves, the ends of said rollers being adapted to engage said packing members, said packing members when engaged by said rollers being in a compressed state, a resilient covering on said rollers, the periphery of said rollers being in engagement, a groove in each of said rollers, said grooves being arcuate, one portion of said grooves being of approximately the same radius as the radii of said casing apertures and diminishing to a point on the periphery of said rollers, said cavities in one position of said rollers forming a passageway through said casing of approximately the same diameter as the diameter of said casing apertures and upon rotation of said rollers the diameter of said passageway diminishing until completely closed by the periphery of said rollers and means to rotate said rollers.

7. A valve for closing the space around pipes of various diameters, said valve including a casing and a pair of cylinders, each of said cylinders having a peripheral recess, said recesses being in alignment, the recesses of said cylinders varying in width and depth and being shaped so that the walls of the recesses form a circle at the contacting portion to completely surround said pipes, said cylinders having a resilient covering on the peripheral surfaces thereof.

In testimony whereof, I hereunto affix my signature.

JOHN YOUNG.